United States Patent [19]

Bateson et al.

[11] 4,074,004
[45] Feb. 14, 1978

[54] PRESSURE-SENSITIVE ADHESIVE TAPE EMPLOYING MOISTURE RESISTANT ACRYLATE-BASE COPOLYMER ADHESIVE

[75] Inventors: George F. Bateson, Roseville; Francis W. Brown, West St. Paul; Steven M. Heilmann, St. Paul, all of Minn.

[73] Assignee: Minnesota Mining and Manufacturing Company, St. Paul, Minn.

[21] Appl. No.: 702,347

[22] Filed: July 2, 1976

[51] Int. Cl.² .............................................. C09J 7/02
[52] U.S. Cl. .................................. 428/355; 428/474; 428/483; 428/504; 428/514; 428/520; 428/287; 128/284; 526/209; 526/232; 526/303; 526/319; 526/328; 427/207 R
[58] Field of Search ............... 428/500, 355, 483, 474, 428/514, 504, 520; 526/209, 232, 303; 427/207 R

[56] References Cited

U.S. PATENT DOCUMENTS

| 2,884,126 | 4/1959 | Ulrich | 428/355 |
| 3,725,121 | 4/1973 | Fournier | 428/355 |
| 3,975,570 | 8/1976 | Ono et al. | 428/355 |

*Primary Examiner*—P. C. Ives
*Attorney, Agent, or Firm*—Cruzan Alexander; Donald M. Sell; Richard E. Brink

[57] ABSTRACT

Normally tacky and pressure-sensitive adhesive tapes, labels, etc. which, when adhered to dry fibrous webs, remain firmly attached when the web and adhesive are thereafter exposed to moist conditions. These performance characteristics, which are not found when conventional pressure-sensitive adhesives are used, result from employing acrylate-based copolymer adhesives made from specific monomers and having inherent viscosities related to the monomers employed.

15 Claims, 1 Drawing Figure

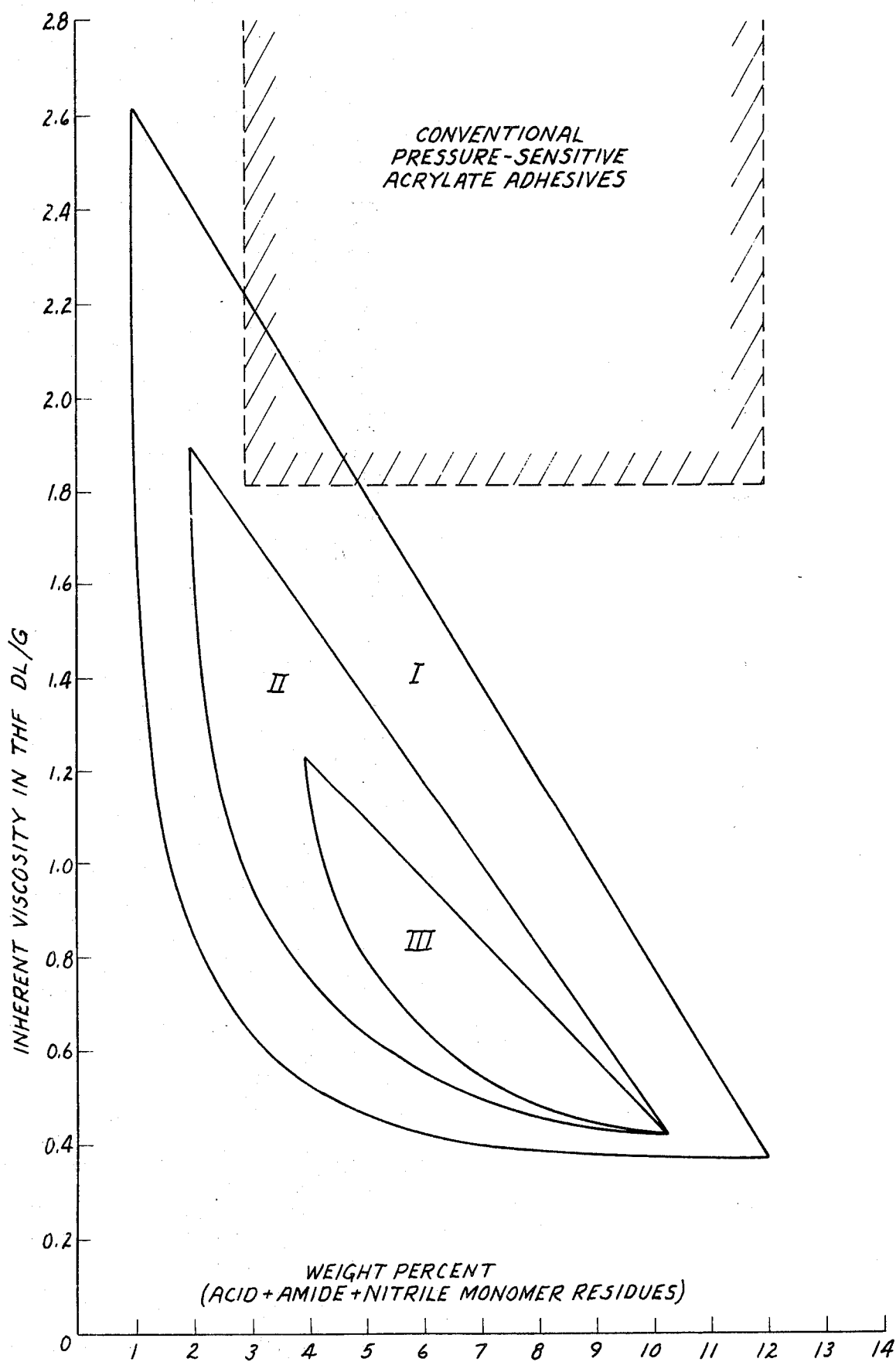

PRESSURE-SENSITIVE ADHESIVE TAPE EMPLOYING MOISTURE RESISTANT ACRYLATE-BASE COPOLYMER ADHESIVE

BACKGROUND OF THE INVENTION

This invention relates to sheet material coated with normally tacky and pressure-sensitive adhesives and is particularly concerned with tapes that will be adhered to fabrics or other fibrous substrates and thereafter exposed to moisture which contacts the interface between the adhesive and the substrate.

Normally tacky and pressure-sensitive adhesive tapes represent one of the most versatile families of products ever devised, performing such diverse functions as insulating, mounting, sealing, mending, holding, masking, labeling, binding, joining, protecting, reinforcing, and numerous others. In recent years, various forms of such tapes have been mounted on the plastic outer liner of disposable diapers and used to hold such garments on an infant. The success of this tape closure program has attracted the attention of persons using conventional cloth diapers, but none of the conventional closure tapes has previously proved satisfactory for use on cloth diapers.

One of the major differences between disposable diapers and cloth diapers is the presence of a moisture-impervious polyethylene film on the exterior of the former product. Many conventional pressure-sensitive adhesive tapes readily bond to the smooth polyethylene, remaining firmly adhered in place until such time as the diaper is to be removed from the infant. Cloth diapers, on the other hand, present a quite different situation. Not only must a successful tape closure bond firmly to the irregular, initially dry fibrous surface, but it must also remain firmly adhered when the diaper thereafter becomes saturated, at which time moisture penetrates from the opposite surface of the diaper and comes into contact with the pressure-sensitive adhesive itself. While obtaining initial adhesion to the dry cloth is not especially difficult, maintaining adequate adhesion in the presence of moisture has heretofore proved virtually impossible. The present invention is devoted to the solution of this perplexing problem.

SUMMARY

The present invention provides for the first time, it is believed, a normally tacky and pressure-sensitive adhesive-coated sheet material which readily bonds to the surface of fabric and which remains firmly bonded even after the fabric subsequently is saturated with moisture. Tape products of the invention thus have a particular utility in the formation of closures for cloth diapers. Such tapes have also proved extremely useful in preparing labels for shirt collars or other clothing which will be subjected to numerous launderings and in forming starting tabs for disposable wet wipe products. Many other analogous uses will readily occur to purchasers of the product.

The tape of the invention is based on the use of a normally tacky and pressure-sensitive adhesive which is a contraindicated modification of otherwise well-known acrylate copolymer adhesives, e.g., of the type shown in U.S. Pat. No. 2,884,126, the disclosure of which is incorporated herein by reference. Acrylate adhesives made according to the aforementioned patent — as well as according to methods employed by all manufacturers of normally tacky and pressure-sensitive adhesive tape — have been based on the accepted belief that the inherent viscosity of a satisfactory pressure-sensitive adhesive should be at least 1.8 deciliters per gram (dl/g) when measured in tetrahydrofuran (THF), and preferably substantially higher. The experience of those skilled in the tape art has previously led them to conclude that any acrylate adhesive having an inherent viscosity below 1.8 dl/g would be deficient in terms of shear resistance and should be expressly avoided for general tape holding applications.

The present invention is based on the unexpected discovery that copolymers of certain acrylate monomers with one or more of certain conjugated vinyl monomers yield remarkable and unexpected benefits when incorporated in a tape product. There is also a specific relationship between (1) the combined percent of the conjugated vinyl monomer residues in the copolymer and (2) the inherent viscosity of the copolymer. Adhesives of the invention bond readily to irregularly surfaced fibrous substrates such as paper, cloth or nonwoven fabrics; surprisingly, they also remain firmly adhered even when the substrate is thereafter saturated with moisture and subjected to repeated flexing. Pressure-sensitive adhesive tape products made with conventional adhesives are incapable of even approaching the performance, in wet environments, of tapes made in accordance with the present invention.

BRIEF DESCRIPTION OF THE FIGURE

Understanding of the invention will be enhanced by referring to the accompanying FIGURE, in which the single FIGURE depicts useful adhesives having effective combinations of (acid + amide + nitrile) residue content and inherent viscosity.

DESCRIPTION OF THE PRESENTLY PREFERRED EMBODIMENTS

The invention is, as previously noted, a contraindicated modification of the conventional pressure-sensitive adhesive tape of the type comprising a sheet backing and a normally tacky and pressure-sensitive acrylate-based copolymer firmly bonded to at least one face. The improvement comprises employing as the pressure-sensitive adhesive a copolymer in which the predominant monomers are acrylates of non-tertiary alkyl alcohols containing on the average, at least 5 — and preferably at least 6 — carbon atoms but not more than 12 carbon atoms. In addition, the combination of weight percent (acid + amide + nitrile) monomers in the copolymers and inherent viscosity of the copolymers is such that these copolymers were previously avoided by those skilled in the tape art. As will be shown, high acid content (e.g., 9–12%) is feasible only where the adhesive's inherent viscosity is extremely low (e.g., 0.4 – 1.0); correspondingly, high inherent viscosities (e.g., 2.0 – 2.6) are feasible only where the acid content is extremely low (e.g., 1–4%).

In preparing adhesive copolymers in accordance with the invention, the acrylate monomer reactants should be based on non-tertiary alcohols containing, on the average, at least 5 carbon atoms in order to obtain products having a suitable degree of tack. The use of acrylates based on at least 6-carbon alcohols even further ensures that the resultant copolymer will display adequate tackiness. Desirably, if the alcohols contain an average of only 5 carbon atoms, the carbon chain will be linear; otherwise, the copolymer should have a low inherent viscosity on the order of 0.4 – 0.6.

The adhesives of the invention are copolymers formed from 100 parts by weight of homopolymerizable ethylenically unsaturated monomers which consist essentially of (1) from about 88 to about 99 parts by weight of monomers consisting of
  (a) 85–100 weight percent acrylic acid ester of at least one non-tertiary alkyl alcohol the molecules of said alcohol containing 1–14 carbon atoms, the average being about 5–12 carbon atoms, and
  (b) correspondingly 15–0 weight percent of at least one monomer selected from the group consisting of vinyl acetate, styrene, vinyl ethers and alkyl methacrylates, and (2) correspondingly from about 12 to about 1 part by weight of conjugated vinyl monomers selected from the classes listed below in the amounts shown, said monomers being selected in types and amounts to impart tacky and pressure-sensitive adhesive properties to said copolymer:
  (a) 0–10 parts by weight of at least one carboxylic acid selected from the group consisting of acrylic acid, methacrylic acid and itaconic acid,
  (b) 0–7 parts by weight of at least one amide containing 3–4 carbon atoms, and
  (c) 0–10 parts by weight of at least one nitrile containing 3–4 carbon atoms.

The degree of polymerization is such that $y$ (the inherent viscosity in THF) is less than $(14-x/5)$, where $x =$ the weight percent of monomers falling under "(2)" above. Stated more specifically, the polymers of the present invention possess a combination of properties such that they fall in Area "I" on the accompanying FIGURE. Areas II and III of the drawing depict successively more preferred adhesives, as will subsequently be pointed out in more detail.

For most prior art tape applications, copolymers of high inherent viscosity, which exhibit high levels of holding power on conventional surfaces, are desired. Ulrich U.S. Pat. No. 2,884,126, implicitly teaches the preparation of acrylate copolymers having high inherent viscosity (i.e., 1.8 or more measured in THF) by avoiding solvents which readily chain transfer, by using polymerization conditions which yield high inherent viscosity, or by using emulsion polymerization. The cited U.S. patent also teaches the need for including at least 3% acid (or other comonomer) in the reaction mixture; the present invention effectively utilizes copolymers containing as little as 1% of such comonomers, provided the proper inherent viscosity is attained.

Copolymers of the present invention are readily prepared by the well-known procedure of charging monomers, solvents, initiator, chain-transfer agents, etc. to a reactor equipped with a temperature-controlling jacket and agitator and then reacting in an oxygen-free atmosphere for a sufficient time to convert the monomers to polymer. On a small scale, such copolymerization is conveniently carried out in bottles.

If a single acrylate-based copolymer (i.e., an unblended composition) is to be used as the adhesive in accordance with the invention, it is essential both that the proper types and ratios of monomers be selected and that the polymerization process be carried out in such fashion as to obtain a polymer having the inherent viscosity range appropriate for the polymer, in other words, so that the properties of the polymer fall in Area "I". Inherent viscosity, which is directly related to molecular weight for a given polymer, can be kept low be including chain transfer agents such as mercaptans or carbon tetrabromide, and certain solvents such as isopropanol, in the reaction mixture. Combinations of high reaction temperature, high initiator level, and low monomer concentration also can be used to assure that the inherent viscosity will be held down when solvents are used which chain transfer to a low degree.

Simple copolymers of iso-octyl acrylate and acrylic acid of the proper inherent viscosity and acid content perform very well for the tape of the invention. However, it has been found that certain non-essential comonomers can be used in limited amounts. Styrene, methyl methacrylate, lauryl methacrylate, vinyl acetate, vinyl ethers and similar vinyl monomers do not materially detract from the performance of the adhesive and may be used to reduce cost. It has also been found that such monomers as styrene and acrylonitrile do not readily polymerize in solution, requiring more initiator and/or higher polymerization temperature to obtain a high degree of conversion of monomer to polymer. As previously noted, such polymerization conditions tend to yield a polymer of lower inherent viscosity and may eliminate the need to employ chain transfer agents. In any case, the polymerization conditions, solvents, and chain transfer agents are selected to produce polymer having the specified inherent viscosity.

If desired, two or more polymers may be blended to obtain an adhesive having an acid content and inherent viscosity which place it in Area "I". Where polymers are blended, it is possible to employ individual polymers some (or all) of which do not have inherent viscosities or acid contents in the required range, provided that the blended adhesive falls in Area "I" on the FIGURE.

Test Procedures

As a quantitative aid to evaluating products of the present invention, it has been found helpful to employ certain empirical tests, which will now be described in more detail.

Wet Performance. Tape is prepared by coating a lightly creped neoprene beater-treated semi-bleached fiber paper backing weight 62 lbs. per papermaker's ream (about 105 g/m$^2$) with a solution of pressure-sensitive adhesive and evaporating the solvent to leave 15 grains per 24 square inches (about 62.5 g/m$^2$) of adhesive solids. To determine the ability of the tape to function as a closure for cloth diapers, a one-inch wide strip of the tape is applied to a 2-ply 80 grade cheese cloth which has been doubled over on itself, the tape overlapping the cheese cloth to provide 1 square inch of tape-cloth contact and extending beyond the folded edge of the cheese cloth. The tape is bonded firmly to the cheese cloth by twice rolling it with a 4.5 pound (approximately 2-kg) automated roller traveling at 12 inches (about 30 cm) per minute. After rolling, the samples are allowed to remain for a period of one-half hour.

The dry dynamic shear force required to remove the tape from the dry cloth may then be measured as the maximum value obtained when the folded cheese cloth is gripped by the upper jaws of a tensile testing machine and the extended strip of tape by the lower jaws, separating them at the rate of 2 inches (approximately 5 cm) per minute. In virtually every case, the cheese cloth tears.

An identically prepared sample is similarly allowed to remain for one-half hour and then immersed for one hour in a pan containing distilled water. The taped sample is then removed and subjected to the same dynamic shear test just described. The average of three samples is reported as the wet shear value. At least 2 psi (about 140 g/cm²), and preferably 3 psi (about 200 g/cm²) is considered necessary for the product to be deemed satisfactory for use as a cloth diaper closure; adhesives having these properties respectively fall within Areas "I" and "II". Everything considered, values of at least 5 psi (about 350 g/cm²), which are displayed by adhesives falling in Area "III", are preferred for products to be used as tape closures for cloth diapers.

Laundering test. Tape is prepared by coating a flexible 6-mil (about 150-micron) spun-bonded polyethylene fiber sheet with a solution of pressure-sensitive adhesive in an amount sufficient to leave 12 grains per 24 square inches (about 50 g/cm²) of adhesive solids. To determine the ability of the tape to function as a garment label, rectangular 3-inch × 1-inch (approximately 7.5-cm × 2.5-cm) strips of tape are applied to swatches at least 12 inches (about 30 cm) square of four test fabrics, using two passes of a 4.5 lb (about 2 kg) hand roller similar to that described in connection with the previous test. The fabrics employed for this test are as follows:

1. Polyester double knit. 38 courses/inch (about 15/cm), 30 wales/inch (about 12/cm), weighing 8.75 oz/yd² (about 297 g/m²).
2. Cotton jersey. Circular knit having 31 courses/inch (about 12/cm) 32 wales/inch (about 13/cm), weighing 4.7 oz/yd² (about 159 g/m²).
3. Nylon tricot. Tricot knit having 53 courses/inch (about 21/cm), 48 wales/inch (about 19/cm), weighing 2.65 oz/yd² (about 90 g/m²).
4. 65:35 polyester:cotton blend. Plain weave having 144 warp threads/inch (about 57/cm), 72 fill threads/inch (about 28/cm), weighing 2.84 oz/yd² (about 96 g/m²).

The fabrics, with tape samples attached, are then subjected to laundering procedures as specified in American Association of Textile Chemists and Colorists (AATCC) Test Method 130–1970. In this test, an automatic washer is loaded with about 4 lbs (1.8 kg) of fabric (including the test fabric) 46 grams of detergent, and sufficient 120° F. (about 50° C.) water to fill it to the high water level. The washer is then run for a standard 12-minute washing period, followed by periods of rinsing and spin-drying. After completion of (wash, rinse, spin-dry) cycles No. 1, 4, 7, 10, 15, 20, 30, 40, and 50, each taped fabric is tumbled in a gas-heated drier for 45 minutes at a maximum temperature of 160° (about 70° C). After cycle No. 50, the samples are evaluated according to the following rating system:

| Rating | Condition |
|---|---|
| 0 | sample no longer attached to fabric |
| 1 | sample only loosely attached to fabric |
| 2 | corners noticeably loose; edges slightly loose |
| 3 | corners loose |
| 4 | slight corner roll |
| 5 | similar to original condition |

For home labeling use, it is considered that an acceptable tape product will have a rating of at least 2; for industrial labeling use, it is considered that a satisfactory product will have a rating of at least 3. An integrated final rating for each sample is the sum of the ratings for each of the four test fabrics. It is preferred that tapes to be used for labeling purposes should adhere well to all of the fabrics; hence an acceptable overall rating value is at least 8 for domestic use, and at least 12 for industrial use. The most preferred tapes will have an overall rating value of at least 16.

Presently Preferred Embodiments of the Invention

An adhesive was prepared in the following manner:
To a 1-quart (about 1-liter) round glass bottle are charged
  212.5 gms solvent blend containing 49.867% each of toluene and ethylacetate and 0.265% 2,2'-azo-bis-(iso-butyronitrile)
  18.8 gms iso-octyl acrylate containing 1% tertiary dodecyl mercaptan
  157.92 gms iso-octyl acrylate
  11.28 gms acrylic acid The bottle was purged thoroughly with nitrogen, capped, and placed in a rotating water bath, tumbled for 21 hrs. at a bath temperature of 53° C and then for an additional 3 hrs. at a temperature of 60° C. The bottle was then removed from the bath. The resulting solution polymer was found to have the following properties: Solids content — 46.7%; Viscosity at 25° C. 850 cps as measured by a Brookfield viscometer using a #3 spindle at 12 rpm. The inherent viscosity in tetrahydrofuran was 0.73 dl/g at a concentration of 0.1744 g/100 ml.

Tabulated below are several iso-octyl acrylate:acrylic acid copolymers, all except the controls, prepared in the manner just described. The tabulated data show the performance of tape made with the various polymers as measured by the tests. The performance of control tapes, made and tested in the same way but employing conventional adhesives, is also shown.

| Example | wt. % acrylic acid | I.V., dl/g | Wet shear, lbs/in² | Laundering test rating |
|---|---|---|---|---|
| Control | 5.5 | 2.27 | 0.0 | 2 |
| Control | 10 | 2.06 | 0.1 | 3 |
| Control | | | 0.2 | |
| Control | (natural rubber resin) | | 0.3 | 0 |
| Control | (rubbery styrene:butadiene:styrene block copolymer-resin) | | 0.0 | |
| 1 (Comparison) | 2 | 0.4 | 0.2 | |
| 2 (Comparison) | " | 0.52 | 0.3 | |
| 3 (Comparison) | " | 0.66 | 1.4 | 1 |

-continued

| Example | wt. % acrylic acid | I.V., dl/g | Wet shear, lbs/in² | Laundering test rating |
|---|---|---|---|---|
| 4 | 2 | 1.02 | 2.4 | |
| 5 | " | 1.20 | 2.3 | |
| 6 | " | 1.35 | 3.5 | |
| 7 | " | 1.62 | 3.5 | |
| 8 | " | 2.01 | 2.6 | |
| 9 | 4 | 0.42 | 0.7 | 0 |
| (Comparison) | | | | |
| 10 | " | 0.52 | 1.5 | |
| (Comparison) | | | | |
| 11 | " | 0.74 | 2.8 | |
| 12 | " | 1.26 | 4.9 | |
| 13 | " | 1.42 | 3.7 | |
| 14 | " | 1.72 | 2.9 | |
| 15 | " | 2.10 | 2.0 | |
| 16 | 5 | 1.13 | 2.4 | |
| 17 | " | 1.87 | 0.7 | |
| (Comparison) | | | | |
| 18 | " | 3.09 | 0.1 | |
| (Comparison) | | | | |
| 19 | 6 | 0.43 | 2.6 | 8 |
| 20 | " | 0.56 | 3.4 | |
| 21 | " | 0.65 | 6.6 | 12 |
| 22 | " | 0.73 | 5.6 | |
| 23 | " | 0.74 | 6.4 | |
| 24 | " | 0.91 | 5.1 | |
| 25 | " | 0.96 | 5.0 | 17 |
| 26 | " | 1.14 | 3.1 | 16 |
| 27 | " | 0.78 (1:1 blend of 0.43 and 1.14) | 8.0 | |
| 28 | 7 | 0.64 | 7.1 | |
| 29 | " | 0.69 | 9.0 | |
| 30 | " | 0.80 | 7.6 | |
| 31 | 8 | 0.46 | 3.7 | |
| 32 | " | 0.50 | 7.6 | |
| 33 | " | 0.52 | 7.1 | |
| 34 | " | 0.57 | 5.2 | |
| 35 | " | 0.58 | 8.7 | |
| 36 | " | 0.60 | 6.1 | |
| 37 | " | 0.66 | 5.1 | |
| 38 | " | 0.78 | 3.5 | |
| 39 | 10 | 0.48 | 3.0 | |
| 40 | " | 0.59 | 2.4 | 12 |

For convenience, a series of abbreviations have been adopted to simplify reference to various monomers, viz.,

| | | |
|---|---|---|
| AA | — | acrylic acid |
| ACM | — | acrylamide |
| ACN | — | acrylonitrile |
| BA | — | n-butyl acrylate |
| IOA | — | iso-octyl acrylate |
| IOVE | — | iso-octyl vinyl ether |
| ita | — | itaconic acid |
| LMA | — | lauryl methacrylate |
| MAA | — | methacrylic acid |
| 2-MBA | — | 2-methylbutyl acrylate |
| MMA | — | methyl methacrylate |
| ODVE | — | octadecyl vinyl ether |
| St | — | styrene |
| UDA | — | n-undecyl acrylate |
| VOAc | — | vinyl acetate |

Tabulated below are examples showing the performance of tape products made with a variety of pressure-sensitive acrylate adhesive copolymers.

| Example | Adhesive | I.V., dl/g | Wet shear, lbs/in² |
|---|---|---|---|
| 41 | 90:10 IOA:ACN | 0.71 | 3.4 |
| 42 | " | 1.05 | 1.7 |
| (Comparison) | | | |
| 43 | 92:8 IOA:MAA | 0.62 | 1.9 |
| 44 | 93:7 BA:AA | 0.72 | 1.2 |
| (Comparison) | | | |
| 45 | 93:7 LMA:AA | 0.82 | 0.0 |
| (Comparison) | | | |
| 46 | 93:7 UDA:AA | 0.78 | 6.7 |
| 47 | 96:4 IOA:ACM | 0.55 | 1.7 |
| 48 | 94:6 IOA-ita | 0.52 | 2.8 |
| 49 | 94:6 BA:AA | 0.79 | 1.0 |
| (Comparison) | | | |
| 50 | 95:5 2MBA:AA | 0.61 | 2.4 |
| 51 | " | 0.72 | 1.4 |
| (Comparison) | | | |
| 52 | " | 0.82 | 1.5 |
| (Comparison) | | | |
| 53 | 97:3 IOA-ACM | 0.34 | 0.6 |
| (Comparison) | | | |
| 54 | " | 0.43 | 1.2 |
| (Comparison) | | | |
| 55 | " | 0.62 | 2.2 |
| 56 | " | 0.92 | 4.0 |
| 57 | " | 1.24 | 3.3 |
| 58 | 79:15:6 IOA:VOAc:AA | 0.80 | 2.5 |
| 59 | 88:7:5 IOA:St:AA | 0.49 | 4.4 |
| 60 | 85:10:5 IOA:LMA:AA | 0.66 | 2.2 |
| 61 | 85:10:5 IOA:MMA:AA | 0.74 | 1.7 |
| 62 | 84:10:6 IOA:ODVE:AA | 0.65 | 3.1 |
| 63 | 84:10:6 IOA:IOVE:AA | 0.59 | 2.9 |

It will be readily appreciated from the foregoing discussion and examples that it is not feasible to provide an exhaustive showing of all products encompassed by the invention. It will likewise be recognized that specific monomers contribute their individual characteristics to the adhesives, and that adjustments may be necessary in both monomer ratios and polymerization procedures to optimize results obtained from a given combination of starting materials.

It will likewise be appreciated that the term "tape" as used herein includes numerous forms of pressure-sensitive adhesive-coated sheet material — e.g., transfer tape, where the adhesive layer is carried on a release liner which is removed after the adhesive is applied to another substrate; labels; double-coated products, in which a layer of adhesive is applied to each side of a sheet material; etc. Similarly, the application of adhesives of the type described to one portion of a sheet (e.g., a shirt collar) inherently produces sheet material of the invention.

In view of the preceding disclosure, the invention is to be considered and construed only in the light of the appended claims.

What is claimed is as follows:

1. In a sheet material comprising a sheet backing and a normally tacky and pressure-sensitive acrylate-based copolymer firmly bonded to at least one face thereof, the improvement which comprises said pressure-sensitive copolymer having an inherent viscosity in tetrahydrofuran of at least about 0.4 dl/g at 25° C. and being a polymer of 100 parts by weight of homopolymerizable ethylenically unsaturated monomers consisting essentially of (1) from about 88 to about 99 parts by weight of monomers consisting of
   (a) 85–100 weight percent acrylic acid ester of at least one non-tertiary alkyl alcohol the molecules of said alcohol containing 1–14 carbon atoms, the average being about 5–12 carbon atoms, and
   (b) correspondingly 15–0 weight percent of at least one monomer selected from the group consisting of vinyl acetate, styrene, vinyl ethers and alkyl methacrylates, and (2) correspondingly from about 12 to about 1 part by weight of conjugated vinyl monomers selected from at least one of the classes listed below, said monomers being selected in types and amounts to impart tacky and pressure-sensitive adhesive properties to said copolymer:
   (a) at least one carboxylic acid selected from the group consisting of acrylic acid, methacrylic acid and itaconic acid,
   (b) at least one amide containing 3–4 carbon atoms, and
   (c) at least one nitrile containing 3–4 carbon atoms,
   no more than 10 parts by weight of either class (a) or class (c) monomers and no more than 7 parts by weight of class (b) monomers being employed, said polymer falling beneath the line $y = (14 - x/5)$, where $y$ = inherent viscosity in deciliters per gram as measured in tetrahydrofuran at 25° C. and $x$ = the total weight percent of the vinyl monomers in "(2)" above, the copolymer having a wet shear strength of at least about 2 lbs/in$^2$, whereby said sheet material applied to dry fabrics remains firmly bonded thereto upon being thereafter exposed to moisture for extended periods of time.

2. A tape in accordance with claim 1, wherein the adhesive falls in Area I on the accompanying figure.

3. A tape in accordance with claim 1, wherein the adhesive falls in Area II on the accompanying figure.

4. A tape in accordance with claim 1, wherein the adhesive falls in Area III on the accompanying figure.

5. A tape in accordance with claim 1 wherein the vinyl monomer consists essentially of acrylic acid.

6. A tape in accordance with claim 1 wherein the acrylate monomer consists essentially of the acrylate ester of alcohol having an average of at least 6 carbon atoms.

7. The tape of claim 6 wherein the acrylate monomer consists essentially of iso-octyl acrylate.

8. The tape of claim 7 wherein the vinyl monomer consists essentially of acrylic acid.

9. The tape of claim 8 wherein the iso-octyl acrylate:acrylic acid weight ratio is in the range of 94:6 to 92:8.

10. A tape in accordance with claim 2 wherein the vinyl monomer consists essentially of acrylic acid.

11. A tape in accordance with claim 3 wherein the vinyl monomer consists essentially of acrylic acid.

12. A tape in accordance with claim 4 wherein the vinyl monomer consists essentially of acrylic acid.

13. A tape in accordance with claim 2 wherein the acrylate monomer consists essentially of the acrylate ester of alcohol having an average of at least 6 carbon atoms.

14. A tape in accordance with claim 3 wherein the acrylate monomer consists essentially of the acrylate ester of alcohol having an average of at least 6 carbon atoms.

15. A tape in accordance with claim 4 wherein the acrylate monomer consists essentially of the acrylate ester of alcohol having an average of at least 6 carbon atoms.

* * * * *

Disclaimer

4,074,004.—*George F. Bateson*, Roseville; *Francis W. Brown*, West St. Paul and *Steven M. Heilmann*, St. Paul, Minn. PRESSURE-SENSITIVE ADHESIVE TAPE EMPLOYING MOISTURE RESISTANT ACRYLATE-BASE COPOLYMER ADHESIVE. Patent dated Feb. 14, 1978. Disclaimer filed May 12, 1982, by the assignee, *Minnesota Mining & Mfg. Co.*

Hereby enters this disclaimer to claims 1-15 of said patent.

[*Official Gazette July 6, 1982.*]